Feb. 20, 1923.
S. P. ELLEBY
MILK COOLER
Filed May 4, 1922
1,446,417
2 sheets-sheet 1
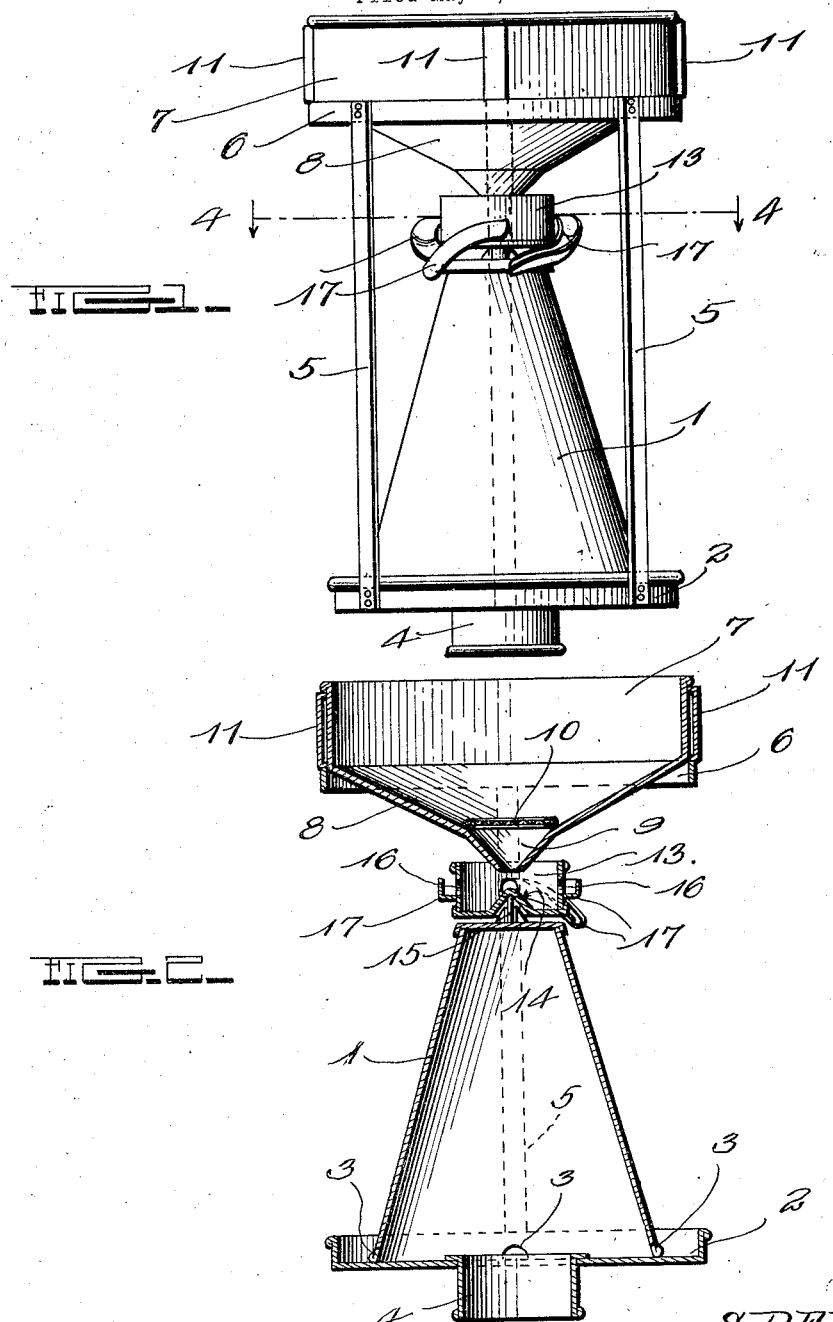
Inventor
S. P. Elleby
By [signature]
Attorneys
Witness
[signature]

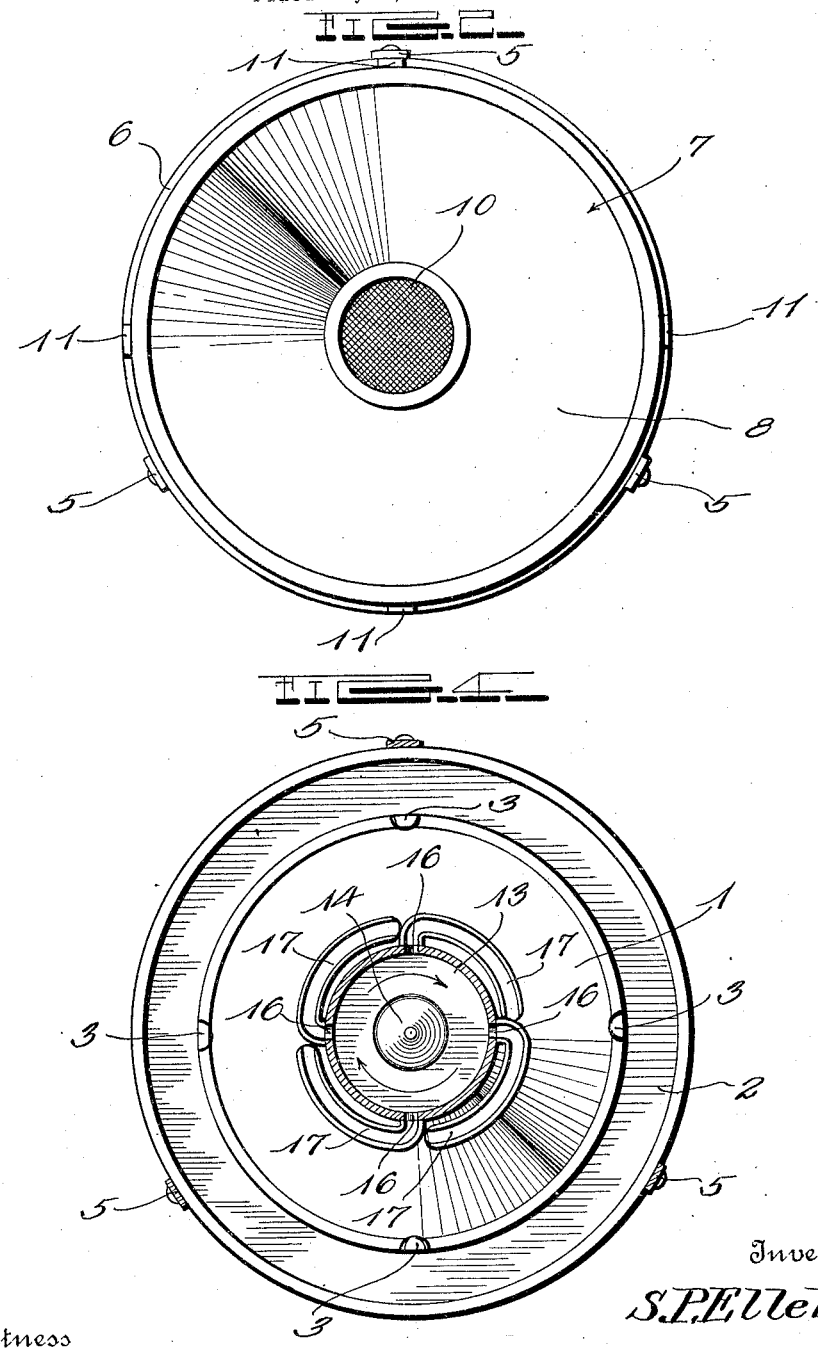

Patented Feb. 20, 1923.

1,446,417

UNITED STATES PATENT OFFICE.

SIEGFRIEDT P. ELLEBY, OF WARREN, PENNSYLVANIA.

MILK COOLER.

Application filed May 4, 1922. Serial No. 558,338.

*To all whom it may concern:*

Be it known that I, SIEGFRIEDT P. ELLEBY, a citizen of the United States, residing at Warren, in the county of Warren and State of Pennsylvania, have invented certain new and useful Improvements in Milk Coolers; and I do declare the following to be a full, clear, and exact description of the invention, such as will enable others skilled in the art to which it appertains to make and use the same.

This invention relates to an improved cooling apparatus which is especially, but not necessarily, designed for cooling milk.

The principal object of the invention is to generally improve upon cooling devices of this class by providing one of extreme simplicity and durability which is practical, the same being such in construction that it permits milk to be cooled by air and obviates the necessity of using any special cooling mediums such as water or the like.

More specifically speaking, it is another object of the invention to provide an improved liquid cooler of this class which embodies a substantially conical body over which the liquid is designed to be distributed, together with a hopper over this body for receiving the liquid, and fluid actuated distributing means which is arranged between the hopper and body and is rotated for evenly distributing the liquid over the entire surface of the body, causing it to flow downwardly in a thin sheet to be effectively cooled by the surrounding air.

Other objects and advantages of the invention will be apparent during the course of the following description.

In the accompanying drawings forming a part of this specification and in which like numerals are employed to designate like parts throughout the same:

Figure 1 is a side elevational view of a cooling apparatus constructed in accordance with this invention.

Figure 2 is a central vertical sectional view of the same.

Figure 3 is a top plan view.

Figure 4 is an enlarged horizontal section taken on the line 4—4 of Figure 1.

In the drawings, the numeral 1 represents a truncated conical body which is by preference hollow, the same resting at its lower end in a receiving trough 2 and being equipped with circumferentially spaced openings 3 to permit the cooled liquid to pass through them and escape from the trough through the neck 4 which is designed to telescope into the upper end of a suitable receptacle, such as a milk can or the like. Secured to and rising from the trough are a plurality of vertical spaced uprights 5 which are connected at their upper ends to a ring 6. This ring constitutes a support for a hopper 7 which has a conical bottom 8 formed with a central discharge opening 9. It may be mentioned here that in practice, a strainer 10 may be arranged in the hopper directly over the discharge opening to retard the passage of the milk through the opening and to partially purify it. It is also to be noted that the rim of the hopper is equipped with vertically disposed circumferentially spaced shoulders 11 which are adapted to rest on the ring 6.

As before indicated, distributing means is interposed between the body and the hopper. Although this distributing means could be of some other construction, it preferably comprises a relatively shallow receptacle 13 which has a depression 14 in its bottom to receive the pointed end of a pivot-pin 15 secured to the truncated end of the aforesaid body. A pivotal mounting for the distributor is thus provided. At circumferentially spaced points, the receptacle is formed with openings 16 from which gutters or conduits 17 extend. As more clearly shown in Figure 1, the free ends of these gutters are directed downwardly toward and terminate in close spaced relation from the surface of the body 1. Due to this construction, the milk is prevented from being wasted as the distributor is rotated, as it is thrown directly against the cooling surface of the body.

The operation of the apparatus is as follows: The milk is deposited into the hopper and passes through the strainer 10 and discharge opening 9 in the conical bottom of the latter. As it is received in the receptacle 13, it is discharged therefrom through the several openings 16 and gutters 17 and due to the weight of the liquid is automatically set into rotation on the pin 15. The rotation of the distributor is not rapid but it travels sufficiently fast to evenly distribute the milk over the entire surface of the conical body for effectively aerating it. The cooled milk is collected in the trough 2 and passes through the several openings 3 in the body and escapes through the neck 4 and is collected in the receptacle provided for this purpose.

From the foregoing description, it is obvious that I have evolved and produced an extremely unique and practical cooling device which is especially designed for effectively cooling milk, the same being such that it entirely obviates the necessity of utilizing special cooling mediums such as ordinarily required with patented and marketed devices with which I am familiar. Hence, the invention will be extremely useful to persons who do not have ready excess to running water.

Although I have described the invention as being used for cooling milk, I wish it to be understood that it may be equally well used for cooling any other liquids.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. In a liquid cooler, a conical body having its apex closed and flattened, a fluid actuated distributor mounted for rotation on said flattened apex, said distributor comprising a receptacle having discharge conduits, the discharge ends of which terminate in close proximity to the surface of said body.

2. In a liquid cooler, a rotary fluid actuated distributor comprising a cup-like receptacle provided with circumferentially spaced discharge openings having gutters leading therefrom, the free ends of said gutters being directed downwardly so that when the distributor is in use, said ends will terminate in close spaced relation from the cooling surface of the body on which the distributor is mounted.

3. A liquid cooler comprising a receiving trough having a discharge neck at its center, a conical body rising from said trough having openings formed in its base to permit passage of liquid through said discharge neck, a hopper arranged over the upper end of said body and having a central discharge opening, and a fluid actuated rotary distributing member mounted on said body between the latter and said hopper, said element comprising a cup having openings from which conduits extend, these conduits having their lower ends terminating in close spaced relation to the cooling surface of said body.

4. In a liquid cooler, a receiving trough for the liquid, a body rising from said trough, the liquid being designed to pass over the surface of said body for permitting it to be cooled by the surrounding air, a plurality of circumferentially spaced uprights secured to and rising from said trough and extending above the upper end of said body, a ring mounted on the upper ends of said uprights, a hopper having a conical bottom formed with a central discharge opening positioned directly over said body, and shoulders secured to the rim of said hopper and resting on said ring.

5. A liquid cooler comprising a receiving trough having a discharge neck at its center adapted to telescope into a collecting receptacle, a truncated conical body connected to and rising from the center of said trough, said body being formed with openings to permit the liquid to pass through them and through said discharge neck, a pivot-pin mounted on the upper truncated end of said body, a cup-like receptacle having a depression in its bottom into which the upper end of said pivot pin extends for rotatably mounting said receptacle, the latter being provided with discharge openings from which conduits extend, the free ends of said conduits terminating in close spaced relation to the cooling surface of said body, a hopper arranged over said rotary receptacle, having a discharge opening disposed directly over said receptacle and supporting means for the hopper between it and the aforesaid trough.

In testimony whereof I have hereunto set my hand.

SIEGFRIEDT P. ELLEBY.